No. 653,185. Patented July 3, 1900.
W. F. REED.
MOWING MACHINE.
(Application filed July 22, 1899.)
(No Model.)
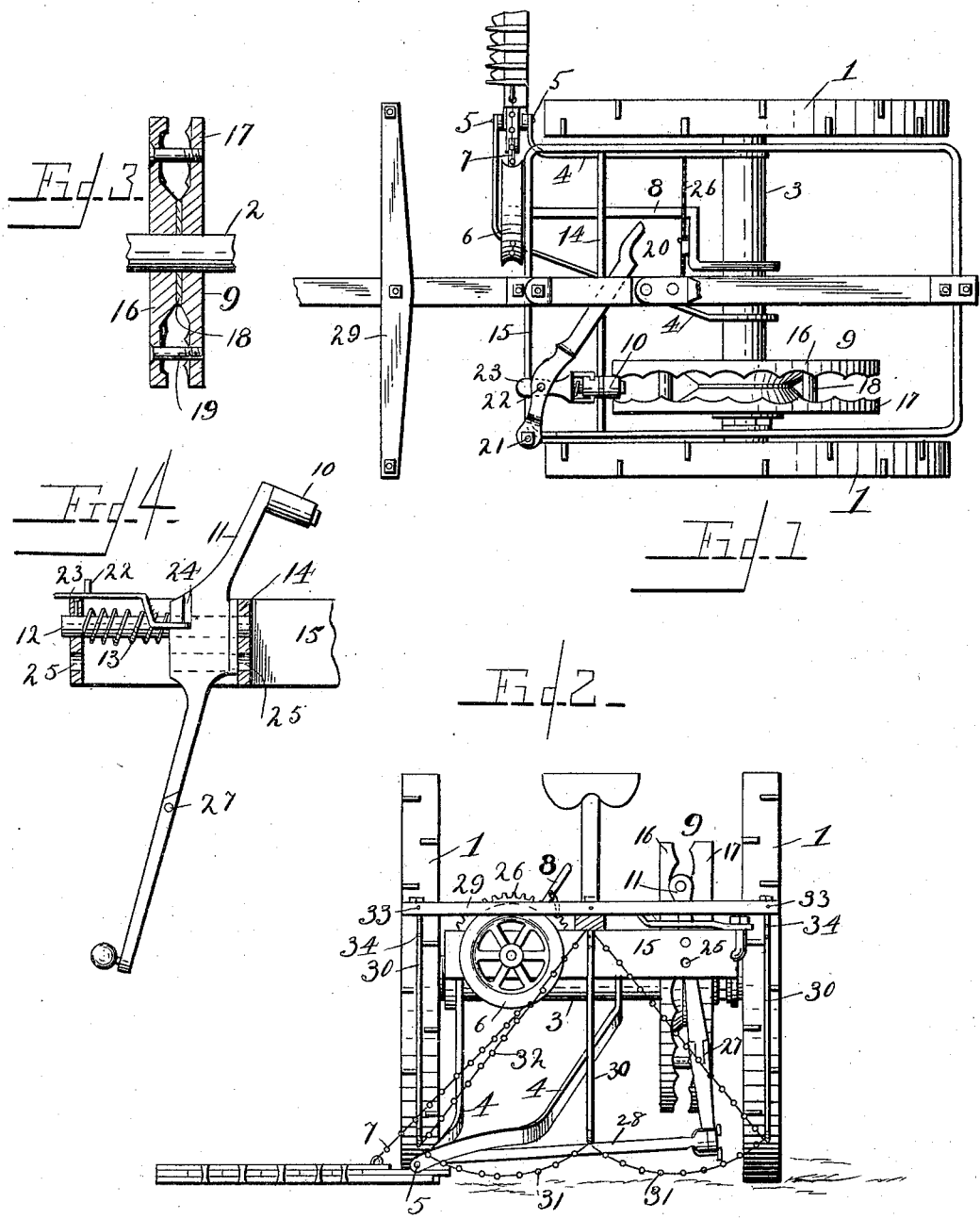
Witnesses
F. L. Ourand
George J. Weber
Inventor
Walter F. Reed
By John A. Saul,
Attorney

United States Patent Office.

WALTER F. REED, OF CAMDEN, SOUTH CAROLINA.

MOWING-MACHINE.

SPECIFICATION forming part of Letters Patent No. 653,185, dated July 3, 1900.

Application filed July 22, 1899. Serial No. 724,858. (No model.)

*To all whom it may concern:*

Be it known that I, WALTER F. REED, a citizen of the United States, residing at Camden, in the county of Kershaw and State of South Carolina, have invented certain new and useful Improvements in Mowing-Machines, of which the following is a specification.

My invention relates to mowing-machines, and more particularly to reciprocating mowers operated from the main shaft or axle of the machine; and the object thereof is to so construct the same that it will be neat, durable, cheaply manufactured, and positive in its operation.

In the drawings forming a part of the specification, and in which like symbols of reference represent corresponding parts in the several views, Figure 1 is a plan view of the device. Fig. 2 is a front elevation. Fig. 3 is a sectional view of the wave-wheel for conveying motion to the cutter, and Fig. 4 is a sectional view of the vibrating bar for communicating motion to the cutter.

1 represents the wheels of the device; 2, the shaft, rigidly keyed or connected to the wheels; 3, a sleeve loose upon the shaft and carrying arms 4 4, which are connected by bolts 5 5 to each edge of the cutter-bar; 6, a pulley; 7, a chain working in the same, and 8 a hand-lever for operating the same and elevating the cutter-bar.

9 is a wave-wheel rigidly connected with the main shaft and normally engaging a friction or stud roller 10 on the end of a vibrating lever 11, said bar being sustained on the main frame by a journal 12, embraced by a coiled spring 13 for the purpose of holding the said bar normally in engagement with the wave-wheel, and 14 is a cross-bar connected with the main frame 15 and forming, together with the main frame, bearings for the journal 12. The wave-wheel is formed of two portions 16 and 17, which have interposed between the same a washer 18 or, if desired, a series of washers for the purpose of compensating for and taking up wear, and thus adjusting the same with relation to the size of the roller. These sections are connected by bolts 19, and can be separated and adjusted as desired.

20 is a foot-lever pivoted at 21 to the main frame and being connected by a pin 22 with a forked arm 23, said forked arm embracing the vibrating lever and resting in slots 24, formed in the sides of the same.

A series of perforations 25 are formed in the main frame and cross-bar 14, so that the vibrating arm may be adjusted, and thus regulate the thrust of the cutter.

26 is a segmental rack for locking the hand-lever when the cutter is elevated.

27 is a joint formed in the vibrating bar, the purpose of the same being to allow the link 28, connecting the same with the cutter, to be raised when the hand-lever is operated and it is desired to throw the machine out of operation for transportation or otherwise.

29 is a doubletree pivoted to the tongue of the machine and having bars 30 penetrating holes in the same, said bars being connected at their bottoms by a chain 31 and having chains 32 extending upwardly to the tongue, thus forming a guard should the machine strike any obstruction. When it is desired to elevate the guard, it may be done by pushing the bars 30 upward through the holes in the doubletree and sustaining them in such position by the pins 33, which pass through perforations 34 in the doubletree.

The operation of the device is as follows: As the machine is drawn over the ground motion is imparted to the cutter by the vibrating lever and the connecting-link. When it is desired to throw the cutter out of operation, the driver operates the foot-lever, and when it is desired to elevate the cutter the hand-lever is operated.

Having now fully described my invention, what I claim as new, and desire to secure by Letters Patent, is—

1. In a mowing-machine, the combination with the main drive-shaft, of a wave-wheel mounted on the same, a vibrating lever journaled in the main frame, a cutter having connection with the same, a friction-roller carried by the same, a spring upon the journal to normally hold said roller in engagement with the wave-wheel, a foot-lever for throwing the roller out of engagement with the wave-wheel, and the fulcrum of said vibrating lever being adjustable with relation to the cutter.

2. In a mowing-machine, the combination with the main drive-shaft, of a wave-wheel rigidly mounted on the same, a cutter, a vibrating lever journaled in the main frame and having a linked connection with the cutter, means for adjusting the fulcrum of the vibrating lever, a friction-roller on the vibrating lever for receiving motion from the wave-wheel, a spring upon the lever-journal to hold the roller in engagement with the wave-wheel, a foot-lever for throwing the same out of engagement with the wave-wheel, a joint in the vibrating lever, and a pulley and hand-lever for elevating the cutting mechanism when the device is inoperative, substantially as described.

3. In a mowing-machine, the combination with the main frame, of a guard supported by a series of rods journaled in the whiffletree of the machine, a series of bolt-holes in the rods so that they may be vertically adjusted in the said whiffletree, chains connecting the bottoms of said rods, and chains extending from the bottoms of the outer rods to the tongue of the machine, substantially as described.

In testimony whereof I affix my signature in presence of two witnesses.

WALTER F. REED.

Witnesses:
C. W. WALLACE,
P. T. BRUCE.